Aug. 7, 1934.  F. J. MOLES  1,969,518
MEASURING CIRCUIT
Filed Aug. 24, 1933
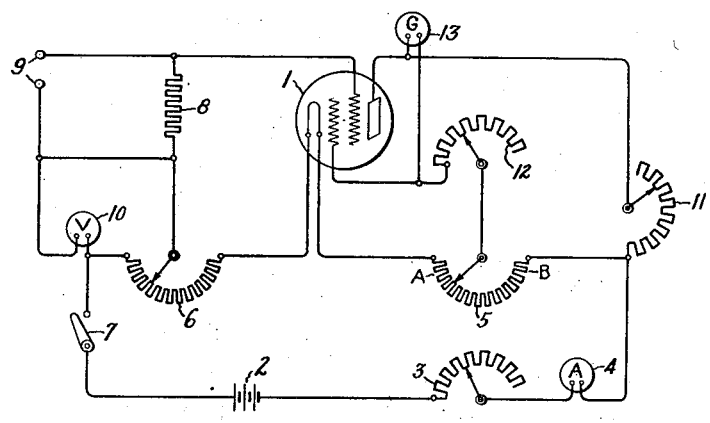
Inventor:
Frank J. Moles,
by Harry E. Dunham
His Attorney.

Patented Aug. 7, 1934

1,969,518

UNITED STATES PATENT OFFICE 1,969,518

MEASURING CIRCUIT

Frank J. Moles, Schenectady, N. Y., assignor to General Electric Company, a corporation of New York Application August 24, 1933, Serial No. 686,553

5 Claims. (Cl. 171—95)

My invention relates to electrical measuring circuits and more particularly to that type of circuit wherein direct currents are amplified.

One of the objects of my invention is to provide a measuring circuit utilizing a single electron discharge device wherein the circuit is balanced and a single source of potential is utilized.

A further object of my invention is to provide a measuring circuit for the amplification of direct current wherein a single source of potential is utilized and means are provided for compensating the changes of potential in the source of potential.

The novel features which I believe to be characteristic of my invention are set forth with particularity in the appended claims. My invention, however, both as to its organization and method of operation together with further objects and advantages thereof, may be understood best by reference to the following description taken in connection with the accompanying drawing in which the single figure represents an embodiment of my invention.

Referring to the drawing, I have shown an electron discharge device 1 having a filamentary cathode, a space-charge grid element, a control grid element and an anode. This electron discharge device is preferably of a type particularly designed for the amplification of direct currents smaller than $10^{-9}$ ampere. Such tube usually has a very high grid resistance, preferably of the order of $10^{16}$ ohms and operates at a very low plate potential.

The source of potential 2 supplies current to the cathode through the rheostat 3, the milliammeter 4, and the potentiometers 5 and 6. The potentiometers and rheostat used in this circuit are preferably of relatively low resistance. A switch 7 is provided for opening and closing the circuit, and the milliammeter 4 is used for determining the proper current for heating up the cathode. An input circuit for the discharge device includes a resistor 8 of relatively high resistance connected between the control grid and the movable arm of the potentiometer 6. The direct current or D. C. voltage to be measured is impressed across the resistor 8 by means of the input terminals 9. A voltmeter 10 is connected between one extremity of the potentiometer 6 and the cathode extremity of the resistor 8. The purpose of this voltmeter will become apparent in the description relating to the operation of the circuit. The anode of the discharge device 1 is connected through a high resistance rheostat 11 to a point on the circuit including the source of potential 2 so that the anode is positive with respect to the cathode. The grid element or space-charge grid is connected through a high resistance rheostat 12 to the adjustable arm of the potentiometer 5. A galvanometer or electromagnetic instrument 13 is connected between the space-charge grid and the anode.

The one-tube balanced circuit just described can also be considered as a simple bridge network where, roughly, portion B of potentiometer 5, and portion A plus the filament resistance are two arms, while resistor 11, and the plate-to-cathode resistance are the other two arms of the bridge. The filament current flowing through the potentiometers 5 and 6 produces voltage drops across the respective resistors. The voltage drop across the resistor 5 serves as potential applied to the anode. A portion of the voltage across this resistor is applied to the space-charge grid, while a portion of the voltage drop across the resistor 6 is utilized to bias negatively the control grid element. If the source of potential 2 changes in value, it is evident that the various potentials applied to the discharge device change. The resistor 12 inserted between the galvanometer 13 and the movable arm of the potentiometer 5 serves to neutralize the effect of the change of voltage in the source of potential 2. When the resistor 12 is properly adjusted and the other resistors are correctly proportioned, this resistor compensates for changes in the potential supplied by the circuit including the source of potential 2 through a range of at least ± 10%.

In operation, the switch 7 of the potential supply circuit is closed and the contact on the resistor 3 is adjusted so that the proper filament current is indicated on the milliammeter 4. The resistor 11 is then adjusted so that proper potential is applied to the anode, and the adjustable point of the resistor 5 is placed so that the proper voltage is supplied to the space-charge grid element. By adjusting a movable contact in the potentiometer 6, the galvanometer can be made to indicate zero deflection with no potential impressed across the terminals 9 of the input circuit. By varying the contact on the resistor 3 so that the current indicated by the milliammeter 4 varies through a range of ±10%, the adjustable contact on the resistor 12 may be placed so that the galvanometer 13 will remain at zero. When this latter adjustment has been completed the apparatus is in condition for measuring currents as small as $10^{-14}$ ampere. An input current I will then produce the change in grid potential $e$, equal to $R_g I$ wherein $R_g$ equals the grid circuit resistance. This will cause a change in anode current which will give a deflection of the galvanometer. By adjusting the contact on the potentiometer 6, the galvanometer is brought back to zero. The meter 10 then reads the value of $e$, from which I is computed if $R_g$ is known. The sensitivity of the amplifier depends on the value of $R_g$ and on the sensitivity of the galvanometer. Thus, if $g_m$ is the mutual conductance of the tube $$g_m = \frac{dI_p}{de_g} = \frac{I_G}{R_g I} = \frac{kd}{R_g I}$$

where $k$ is the galvanometer sensitivity, $I_G$ is the galvanometer current, and $d$ the galvanometer deflection for the input current I.

While I have shown a particular embodiment of my invention, it will, of course, be understood that I do not wish to be limited thereto, since it is apparent that the principles disclosed herein are susceptible of numerous other applications, and modifications may be made in the circuit arrangements and in the instrumentalities employed without departing from the spirit and scope of my invention as set forth in the appended claims.

What I claim as new and desire to secure by Letters Patent of the United States is:

1. The combination of an electron discharge device having a cathode, a grid element, a control grid element and an anode, a circuit including a source of voltage connected with said cathode, means for obtaining from said circuit a voltage for said anode, means for obtaining from said circuit a voltage for said first grid element, an electromagnetic instrument connected between said anode and said first grid element, and means connected between said latter means and said first grid element for compensating the changes in voltages supplied by said circuit.

2. The combination of an electron discharge device having a cathode, a grid element, a control grid element and an anode, a circuit including a source of voltage connected with said cathode, means for obtaining from said circuit a voltage for said anode, means for obtaining from said circuit a voltage for said first grid element, an electromagnetic instrument connected between said anode and said first grid element, and means connected between said latter means and said first grid element for compensating the changes in voltages supplied by said circuit through a range of at least ±10% change.

3. In a measuring instrument, the combination of an electron discharge device having a cathode, an anode and two grid elements, an input circuit connected between said cathode and one of said grid elements, a circuit including a resistor connected between said cathode and said anode, an indicating device and a resistor connected in series between said anode and an intermediate point on said first resistor, one terminal of said indicating device being connected to said anode, and a connection from said other grid element to a point between said indicating device and said second resistor.

4. In a balanced circuit, the combination of an electron discharge device having a cathode, an anode, a control grid element and a grid element, a resistor and a source of voltage connected in series with said cathode, a resistor connected between said source of voltage and said anode, an electromagnetic instrument and a resistor connected between said anode and an intermediate point on said first resistor, and a connection from said first grid element to said indicator and said last-mentioned resistor.

5. In a measuring circuit, the combination of an electron discharge device having a filamentary cathode, a space-charge grid, and an anode, a resistor and a source of voltage connected in series with said cathode, a resistor connected between said anode and said source of voltage, an electromagnetic instrument connected between said anode and an intermediate point on said first resistor, a connection from said space-charge grid to said intermediate point on said first resistor, and a resistor connected in series with said instrument and said connection for compensating the changes in voltage of said source of voltage.

FRANK J. MOLES.